(12) United States Patent
Mai (10) Patent No.: US 10,567,190 B1
(45) Date of Patent: Feb. 18, 2020

(54) "IF THIS THEN THAT" ADAPTIVE SYSTEM (71) Applicant: Xiao Ming Mai, East Brunswick, NJ (US)

(72) Inventor: Xiao Ming Mai, East Brunswick, NJ (US)

(*) Notice: Subject to any disclaimer, the term of this patent is extended or adjusted under 35 U.S.C. 154(b) by 0 days.

(21) Appl. No.: 16/101,093

(22) Filed: Aug. 10, 2018

(51) Int. Cl.
G06N 5/04 (2006.01)
H04L 12/28 (2006.01)

(52) U.S. Cl.
CPC ......... *H04L 12/2829* (2013.01); *G06N 5/042* (2013.01); *H04L 12/282* (2013.01); *H04L 12/2834* (2013.01)

(58) Field of Classification Search
None
See application file for complete search history.

(56) References Cited

U.S. PATENT DOCUMENTS

| | | | |
|---|---|---|---|
| 9,547,980 B2* | 1/2017 | Chen | G08C 17/02 |
| 9,733,808 B2 | 8/2017 | Pesola et al. | |
| 2014/0351180 A1* | 11/2014 | Canoy | G06N 99/005 |
| | | | 706/12 |
| 2014/0351800 A1 | 11/2014 | Jao et al. | |
| 2015/0119667 A1 | 4/2015 | Reihman et al. | |
| 2015/0164390 A1 | 6/2015 | Larvenz et al. | |
| 2015/0334187 A1 | 11/2015 | Pesola et al. | |
| 2016/0241660 A1 | 8/2016 | Nhu | |
| 2017/0033942 A1 | 2/2017 | Koeninger | |
| 2017/0249763 A1 | 8/2017 | Garvey et al. | |
| 2017/0289184 A1* | 10/2017 | C | H04L 63/1425 |
| 2017/0331906 A1 | 11/2017 | Choi et al. | |
| 2018/0295141 A1* | 10/2018 | Solotorevsky | G06N 20/00 |
| 2018/0313557 A1* | 11/2018 | Turney | F24F 11/30 |
| 2018/0314324 A1* | 11/2018 | Abed Aljawad | G06F 3/013 |
| 2018/0322405 A1* | 11/2018 | Fadell | H04W 4/80 |
| 2019/0065993 A1* | 2/2019 | Srinivasan | G06N 7/005 |

OTHER PUBLICATIONS

Perera, C. et al., "Context-aware computing in the internet of things: a survey of internet of things from industrial marketing perspective," arxiv.org preprint, dowloaded from <arxiv.org/abs/1502.00164> (Jan. 2015) 19 pages (Year: 2015).*
Ur, B. et al., "Practical trigger-action programming in the smart home," Proc. of the SIGCHI Conf. on Human Factors in Computing Systems (2014) 10 pages (Year: 2014).*
Rashidi, P. et al., "Keeping the resident in the loop: Adapting the smart home to a user," IEEE Trans. on Systems, Man, and Cybernetics, vol. 39, No. 5 (Sep. 2009) pp. 9 49-959. (Year: 2009).*
Rollins, S. et al., "Using rule mining to understand appliance energy consumption patterns," 2014 IEEE Intl. Conf. on Pervasive Computing and Communications (2014) pp. 29-37. (Year: 2014).*

* cited by examiner

*Primary Examiner* — Kakali Chaki
*Assistant Examiner* — Brian M Smith
(74) *Attorney, Agent, or Firm* — Weitzman Law Offices, LLC (57) ABSTRACT

A system is disclosed for anticipating and rendering unnecessary human action in a smart home or other connected environment. Sensor data and data from smart appliances may be used to determine and predict human user behavior to a degree that allows an automated system to act upon the appliances or other devices even before the human user is able to act, allowing the human user's past actions to program the automated system without conscious effort by the human user to define the conditions under which an action should be taken.

16 Claims, 5 Drawing Sheets

"IF THIS THEN THAT" ADAPTIVE SYSTEM

FIELD OF INVENTION

This application relates to methods and systems for applied machine learning, and more specifically for adapting to a repeated sensor stimulus by anticipating and facilitating a likely response to the stimulus by a human user.

BACKGROUND

Many existing software services or hardware devices allow for the setting of "If This Then That" (IFTTT) rules to be followed by an always-processing artificial intelligence agent. Examples may include "If temperature is above X, activate air conditioning," in a thermostat, or "If an email contains the keyword 'X' in its subject line, forward the email as a text to the recipient's mobile phone," in an email client.

IFTTT rules may be custom-written by a user in a scripting interface or application programming interface (API) offered by the service provider or manufacturer. This solution can be highly labor intensive and prone to error if the conditionals are improperly expressed or fail to take into account unconscious expectations by the user. Alternatively, rules already written by other human users may be selected and downloaded from a central database or curated collection of options intended to work with particular devices or software services. This solution makes it unlikely that the downloaded rule will be as applicable to a user's specific needs as a custom-written solution would be.

The rise of the so-called Internet of Things (IOT) and widespread incorporation of wireless communications interfaces into "smart appliances" has led to the possibility of fine control over and sensor feedback from a number of household devices in communication with a user's computing device.

SUMMARY OF THE INVENTION

Because existing methods can only generate IFTTT rules as quickly as human users can intentionally conceive of them and record them, there is a need for automated systems that simplify the process and remove the bottleneck of human intention and implementation. The present disclosure provides substantial improvements over current technologies and methods of automating smart appliances or setting up routines to perform a task that a human user likely intended, given the circumstances, but without requiring the user to explicitly design the routine, nor to affirmatively consent to the routine or smart appliance action. Through observation of a series of human actions over time, a system may determine the most likely set of stimuli or environmental factors that led to those actions and convert the stimulus-action pair into an IFTTT-like rule that can be prospectively applied so that the same environmental conditions trigger the same outcome without requiring the human user to act.

A system for anticipating and replacing human action is disclosed herein. The system comprises one or more electronic sensors, one or more smart appliances; and a central computing device comprising one or more processors and non-transitory memory storing instructions. The instructions, when executed by the one or more processors, cause the central computing device to receive one or more sensor readings from the one or more electronic sensors during a first time period; receive one or more status readings from the one or more smart appliances during the first time period; and determine, based on a temporal relationship between the one or more sensor readings and one or more status readings, a logical relationship between the one or more sensor readings and one or more status readings. Based on the determined logical relationship, the system creates an "if this then that" (IFTTT) rule, wherein a "then that" consequence of the IFTTT rule is a change in status of one smart appliance of the one or more smart appliances determined to have been intended by a human user. In response to determining, during a second time period after the first time period, that sensor readings or status readings match an "if this" condition of the IFTTT rule, the system implements the "then that" consequence of the IFTTT rule instead of the human user manually implementing the change in status of the one smart appliance.

DETAILED DESCRIPTION

Figure 1:
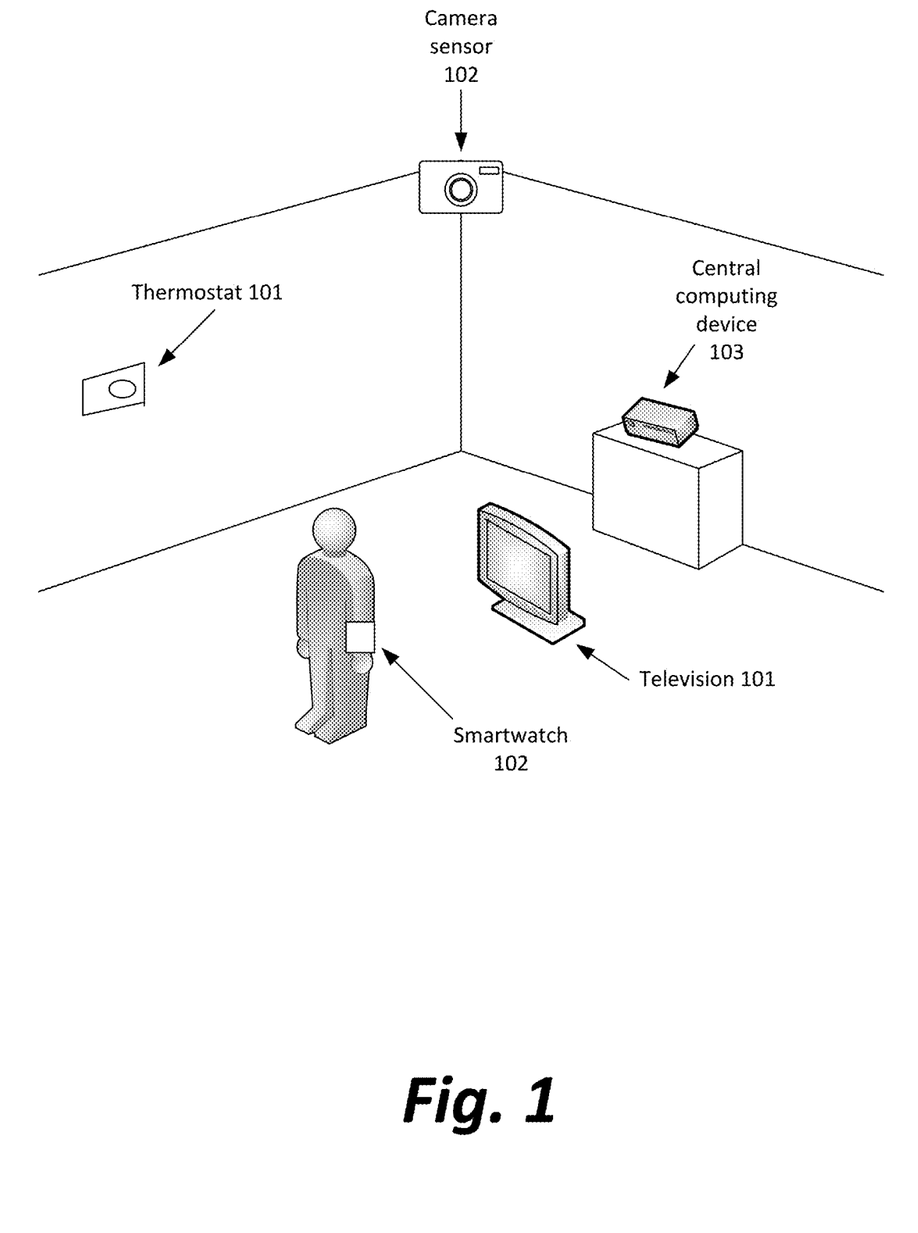
FIG. 1 depicts in simplified form, an example household with one or more smart devices as described herein.

FIG. 1 depicts in simplified form, an example household with one or more devices as described herein. Although the environment of the devices is described throughout this disclosure as a household or inside of a household's room, other environments may be equally suited, including an office, professional kitchen, place of business, a warehouse or other industrial environment, a public area such as a library or museum, or the inside of a vehicle.

One or more smart appliances 101 may be incorporated into a household system of devices. Smart appliances 101 may include, for example, any of a thermostat, personal digital assistant (e.g., Amazon's Alexa or Google Home), refrigerator, door knob/lock, home security/alarm system, television, cable set top box, gaming console, DVD player, alarm clock, LED lights, automated blinds, garage door, robotic vacuum cleaner, a self-driving car or any functions of a car including the windshield wipers, headlights, cruise control, and climate control, or other commercial devices configured to receive (whether wirelessly or by wired communication interface) commands to perform some useful function for—or return data to—a human user. Appliances may be more loosely described as including other services to which a human user subscribes and with which a human user interacts, such as email, texting, a grocery delivery service, or pizza or other food delivery service. In the most general sense, an appliance 101 may be any device or system with an actuator or potential for action that can be triggered by an outside input, whether that is a command through an API or receipt of electricity to a motor after a switch is toggled.

A household may also contain one or more sensors 102 or other sources of data input, either as standalone devices capable of communicating with a central computing device 103 or incorporated into a mobile computing device, laptop computing device, desktop computing device, or any other device that can forward data received from the sensors to a central computing device 103. In some embodiments, sensors 102 may also be worn by a human user, such as sensors incorporated into a smartwatch, fitness tracker, smart eyeglasses, or mobile phone. The sensors 102 may also, in some embodiments, be remote from the household and their data reported to the household by a data network or transmission, such as sensors connected with a weather reporting service, a traffic reporting service, remote security cameras, or other automated or partially-automated data sources.

The sensors may include, for example, a security camera, a microphone, global positioning system (GPS) receiver, radio-frequency identification (RFID) chip reader, photo sensor (such as a light/darkness sensor), infrared light sensor, movement sensor, vibration sensor, three-dimensional accelerometer, altitude sensor, depth sensor, thermometer, barometer, humidity sensor, air quality sensor, pollen sensor, smoke detector, radon detector, carbon monoxide detector, sensor for the presence or absence of any gas in the air (including presence or lack of oxygen, or presence of a poisonous, acidic, or noxious gas), conductivity sensor, sensor for the presence of water, water quality sensor (including presence of any substance in water, such as heavy metals, water hardness, bacteria, etc.), or other sensor of environmental phenomena.

Sensors may also be construed to include the communications interface of any device that makes tangible to a human a communication signal from an external source, such as a computer that receives an email or other data transmission; a mobile phone that receives a text message, telephone call, or push notification; a radio, television, or computing device that facilitates receiving a data stream and which can interrupt the stream with a received warning about an imminent flood, tornado, or other weather phenomenon; etc.

The general unifying purpose of each of these sensor descriptions is that a human user may receive information or sensory experiences that induce the user to act, and which a system aiding the user may also receive in order to facilitate or anticipate the human user's action.

A central computing device 103 may constantly receive a stream of data input from the smart appliances 101 and/or sensors 102, regarding the current state of each appliance, any changes in state (such as when an appliance is turned on or off; when a user interacts with the appliance; etc.) and any sensor readings from the sensors, and may store the information in a database associated with timestamps or at least in a well-ordered format such that the temporal relationship between two events may be determined. The database may be stored externally in some embodiments.

In some embodiments, central computing device 103 may be a standalone computing device specially configured with the necessary communications interfaces, sensor input ports, and pre-installed hardware and software to perform the various functions described herein. In other embodiments, central computing device 103 may be software installed on a general computing device having the capability of communicating with the various appliances 101 and sensors 102 through, for example, a Bluetooth or other wireless connection. In some embodiments, the functionality associated with central computing device 103 may actually be performed by a mesh network of separate computing devices to provide either redundancy or improved network/sensor coverage.

In some embodiments, the central computing device 103 may essentially be a dumb terminal that conveys sensor and appliance data from the environment to a server in the cloud for storage and/or processing, rather than storing or processing the data locally. As a result, the remote server in the cloud may be responsible for any/all of: receiving initial sensor and appliance data, establishing IFTTT rules based on the received data, storing the IFTTT rules, receiving new sensor data and determining whether the data should trigger an IFTTT rule, transmitting commands to appliances to act when an IFTTT rule is triggered, providing an interface to modify existing rules, or determining whether automatic modifications of existing rules should be made. In some embodiments, some functions may be offloaded to a cloud environment (such as determining what IFTTT rules should be established) while others remain locally on central computing device 103 (such as storing the determined IFTTT rules, deciding whether the IF conditions of an existing rule are met, and communicating with appliances to implement the consequences of the rule).

By way of example, central computing device 103 may record, over a period of hours, the internal air temperature of the rooms of a house at each minute (as recorded by a thermostat or thermometer in those rooms), the location of a human user within the house at each second (as recorded by a camera or motion detector or near field communications of a device worn by the user), the status of any fans in the house each minute (whether they are on or off, what speed they are set to), the status of any windows in the house each minute (whether open or shut, and how many inches or what percent open they are), the status of the air conditioner each minute (on or off, how powerful the cooling is set), etc. This constant stream of input data may help in establishing a likely logical relationship between events based on the temporal relationship between the events. The central computing device may determine that after the temperature in a room reaches a certain level, windows are opened or opened further by the user, fans are turned on or turned higher by the user, or air conditioning is turned on or made more powerful by the user, but the temperature that triggers the user's action is different in a living room than from a bedroom or an exercise room. Thus, based on the data alone, without programming to treat living rooms and exercise rooms differently or to understand the changes that exercise brings about in the human body, a system may intuit based on the pattern of human behavior that something is different about living rooms and exercise rooms, and that human users prefer to keep exercise rooms cooler.

Figure 2:
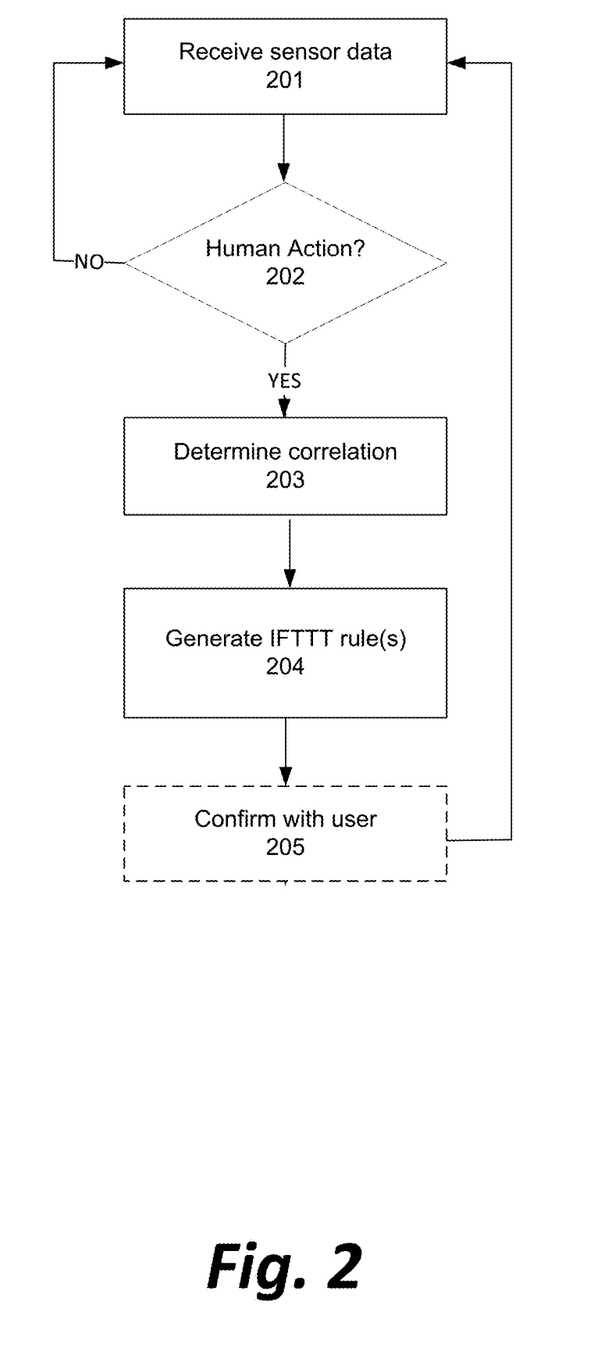
FIG. 2 depicts, in simplified form, a method of establishing more sophisticated IFTTT rules based on observations of human actions in a smart household or other environment.

FIG. 2 depicts, in simplified form, a method of developing IFTTT rules based on observations of human actions in a smart household.

First, the system may repeatedly receive appliance, sensor, and human action data over a period of time (Step 201). An example regarding a user's actions to cool down a hot room to a desired temperature has already been described above. In another embodiment, a system may track the status of a car's being turned on or off as well as a human's location in the household, the time of day, the day of the week, and other data from appliances in the home, such as when hot water is drawn from a water heater to a shower or when a refrigerator is opened. In another embodiment, a system may track when a television or desktop computer is turned on, as well as human location, time of day, day of week, input from a cable set top box indicating what television shows are currently being played, and data from a human user's calendar stored in a mobile device or online service. In another embodiment, a system may track the contents of a smart refrigerator, when a user is eating food, time of day, day of week, data from the user's calendar, and whether the user orders a pizza (and if so, what size and toppings of pizza are ordered). In another embodiment, a system may track a level of light in a room, a location of a human user, what is being displayed on one or more televisions or computers in the room, a volume of noise in the room, and whether the human user opens or closes curtains or blinds on a window of the room.

The system does not necessarily know to track only the specific sets of sensor and appliance data described above which are likely to be correlated with each other. Instead, the system may be completely agnostic to the significance of any of the data received, and only develop an "understanding" of the relationships between data points over time and in response to receiving more data, as described in the steps below.

Whenever the central computing device determines, based on appliance or sensor data forwarded to the central computing device 103, that the human has taken a discrete action (Step 202), such as turning an appliance on or off, or interacting with an appliance to receive information (such as looking inside a fridge, checking the time on a wall clock, or checking mail on a computer) the system will then attempt to determine correlations between human action data and sensor or appliance data that preceded or coincided with the human action data (Step 203).

In some embodiments, the data considered to determine correlations may be only the status of appliances and the environment at the moment the human acted; i.e., the temperature at that moment, the humidity at that moment, whether a car was on at that moment, etc. In other embodiments, the central computing device 103 may consider data over a certain window of time leading up to the human action, such as—by way of example only—the previous five seconds, ten seconds, minute, five minutes, or half-hour. In such a case, the central computing device may be able to determine a rate of change in one or more system parameters (such as temperature over time or humidity over time) or a difference in time between two events (such as a human user activating a shower three minutes after getting out of bed), and use that information to correlate a rate of change or absolute change in a sensor reading with a human action at a defined period of time after the change occurs. In some embodiments, time frequency analysis or other analysis to determine periodic repetitions in input data may be used to find a statistical correlation between a human action and a sensor reading at a relatively constant period of time before the human action, even when the human action tends to be relatively random in terms of the time of day that it occurs.

In response to the determined correlations, or a weak correlation becoming stronger as more data is input into the system over time, the central computing device 103 may establish one or more IFTTT rules of varying complexity (Step 204). In examples tracking the example embodiments previously described, the central computing device 103 may establish rules such as:

a. "IF user's location is living room AND the temperature in living room is at least 80 degrees Fahrenheit AND the humidity in living room is at least 30% THEN increase air conditioner strength by one level."

b. "IF user's location is the kitchen AND the temperature in the kitchen is at least 90 degrees Fahrenheit THEN activate a fan in the kitchen."

c. "IF user's location is at the door to the garage AND the time is after 8:30 am AND the car is off THEN start the car's ignition."

d. "IF user's location is the living room AND cable is showing a comedy film AND the user is not currently using the desktop computer THEN turn on the television AND change the channel to the comedy film."

e. "IF user receives a telephone call AND user is currently watching television AND ambient volume is greater than 80 decibels THEN turn down the volume on the television until the ambient volume is less than 50 decibels."

f. "IF user is exiting the bed AND the time is after 7:00 am AND the day of the week is a weekday THEN activate a tankless hot water heating system."

g. "IF user puts car into reverse AND the time is after 5:30 pm THEN send a text message saying 'On my way home.'"

h. "IF fridge is less than 20% full AND the time is after 5:00 pm AND a user says the word 'hungry' THEN order a pizza with saved payment information."

The generated rules may be much more precise and contain many more conditions than the rules described above. For example, described above are very precise rules that only contain one to three conditions which a human can verify are logically connected to the THEN consequence. However, since a computing device may lack any pre-programmed knowledge about the significance of any given sensor reading, an initially established rule may contain IF conditions that ultimately do not reflect a human user's intent or thought process. For example, if a user nearly simultaneously turns up the air conditioning and turns on the television, the system might initially establish two rules: "IF temperature is exactly 80 degrees AND humidity is exactly 35% AND time is exactly 6:00 pm AND day is Monday AND ambient noise volume is exactly 30 dB, THEN turn up air conditioning" and "IF temperature is exactly 80 degrees AND humidity is exactly 35% AND time is exactly 6:00 pm AND day is Monday AND ambient noise volume is exactly 30 dB, THEN turn on television to channel 5." A human observer can see three problems with the above rules: each one incorporates a condition that is irrelevant to the human's action (the background noise), each one requires an exact coinciding set of values that might never occur again, and each incorporates two conditions that were relevant to establishing one rule but not the other.

To avoid generating rules that are useless in their specificity because they incorporated a sensor reading that was, at the time irrelevant, generated rules may include a range of values for triggering an IF condition, such as: instead of exactly 80 degrees, a temperature of 80 plus or minus two degrees, or any temperature greater than 80 degrees; instead of exactly 6:00 pm, 6:00 pm plus or minus one minute, or any time after 6:00 pm; instead of exactly 35% humidity, a humidity of greater than or equal to 35%; etc. Ranges may be set as an absolute difference, a proportional difference based on the sensor value (for example, plus or minus 5% of the actual sensed value), a proportional difference based on the sensor type (for example, plus or minus 1% of the total range of possible values for the sensor), a finite or unbounded greater range (all values greater than the sensed value; a value up to n units greater, but no less), or a finite or unbounded lesser range (all values less than the sensed value; a value up to n units less, but no greater), as appropriate for a given sensor or the usual significance of the sensed quality in human actions.

If two rules are generated that have greater than a certain degree of similarity, the system may harmonize them into a single rule. For example, if on one occasion a user had entered the room and turned on their television at 6:01 pm, while on another, the user entered and turned on the television at 6:03 pm, the system might combine two established rules to generate a single rule: "IF user enters room AND time is between 6:01 and 6:03 pm THEN turn on television."

In some embodiments, IFTTT rules may be generated whose IF conditions are processed along a "fuzzier" logic. For example, a rule may have a number of different IF conditions (for example, eight), and the THEN consequence may be intended if some subset of the IF conditions are met (for example, any seven out of the eight). Some IF conditions may be designated as essential, while other conditions are non-essential—for example, having an IFTTT rule with five conditions, of which the first and second must be satisfied, and out of the remaining three, two of which must be satisfied, for four conditions in total.

IFTTT rules may be expressed in a Boolean logic as a statement other than the intersection of a plurality of IF conditions, instead utilizing OR, NOT, NOR, XOR, NAND, or other operators. For example, a complex rule might read "IF X AND Y XOR A OR B, THEN . . . " if that expression best approximates the conditions under which a human user would want to act.

Other IFTTT rules may be generated which have a numerical weighting of each IF condition, with the THEN consequence being triggered if the total score of all satisfied IF conditions exceeds a certain value. For example, a rule might assign 40 points to the temperature, 30 points to having a certain number of users in the room, 20 points to the humidity, and 10 points to the time of day, and trigger a THEN consequence of increasing the air conditioning only if the total score is 70 points or higher. This principle may be extended to a logistic model where the outcome of the IFTTT rule is not a binary "act/don't act", but instead a probability of acting, so that as more conditions are met, the likelihood of the system acting during a given time frame increases.

In some contexts, human users may be identified and differentiated by the system, and either disregarded in the establishment of new rules, or have user-specific rules established to anticipate only actions by a particular user or class of users. For example, a family might configure the system to recognize only actions of family members, and not to learn from or try to anticipate the actions of guests in the home. In an industrial environment, a system might learn to begin warming up an industrial machine when a worker approaches it, or to unlock an office door when a manager approaches it, or to deactivate an industrial machine if a non-employee approaches it, but not to take any of these actions when a person outside the described class approaches one of the given items. An operator of the system may enter a set of users or user classes to be treated independently by the system in establishment or implementation of rules, and identification of users (and/or association with a user class) may be accomplished via facial recognition, voice recognition, possession of a token such as an ID card or name tag, a work uniform, or other method.

After establishing a rule, the system may optionally prompt the human user for confirmation that the rule accurately represents the user's intent (Step 205). For example, the system might use a graphical user interface of central computing device 103, or another generated interface on a computing device available to the user, to display a message telling a user, "From now on, when it is 6:00 pm on a Monday and you're in the room, your TV will automatically turn on if it wasn't already. [Confirm] [Cancel]." Alternatively, the notification might be generated by a speaker waiting to record the human user's confirmation or cancellation by voice or other audio command.

Figure 4:
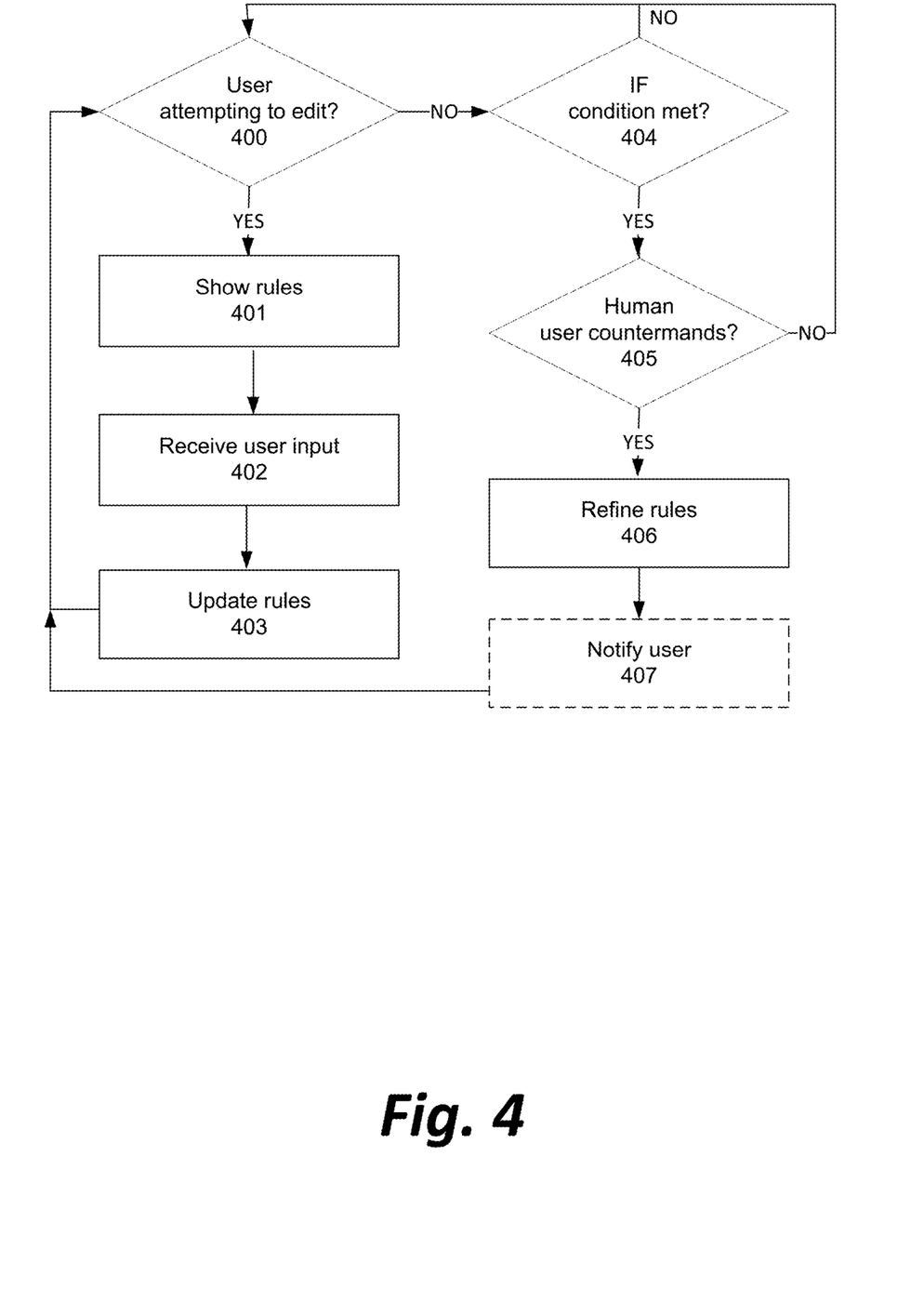
FIG. 4 depicts, in simplified form, a flowchart of a method for allowing a human to refine existing IFTTT rules.

In some embodiments, the rule might require human confirmation to be entered into a database of central computing device 103, while in others, the rule may be entered into the database unless the user specifically requests that the rule not be added. In some embodiments, the system may allow the user to edit the rule before saving the rule (see Steps 401-404, below).

Figure 3:
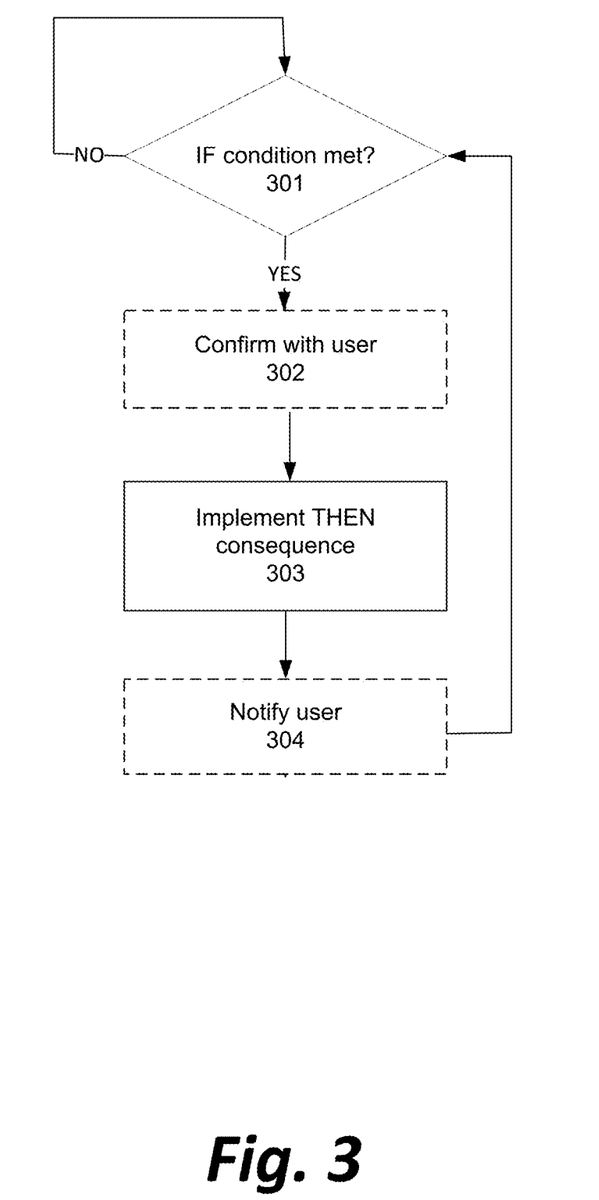
FIG. 3 depicts, in simplified form, a flowchart of a method for acting upon a determined IFTTT rule.

After establishing the rule, the system may return to observing the human user's interactions with appliances 101 and correlating them with the data received from the sensors 102 (back to Step 301).

The control loop of FIG. 2 may be integrated with or separated from the control loop of FIG. 3, below, for acting upon rules that have been determined. For example, a system might have three activity modes that a user can toggle between: "Only learn, but don't act" (the loop of FIG. 2), "Only act on existing rules, but don't learn new ones" (the loop of FIG. 3), or "Both act on existing rules and observe to learn new ones." A user having company over might want to switch into a non-learning mode to avoid the system learning behaviors of guests, and/or switch into a non-active mode to avoid startling guests that are not expecting automated behavior.

FIG. 3 depicts, in simplified form, a flowchart of a method for acting upon a determined IFTTT rule.

Using sensor data received from the sensors 102, the system may determine whether the IF conditions of any stored IFTTT rule are satisfied (Step 301), including any computations necessary to determine that a fuzzy logic is met, a Boolean expression is met. If the conditions are not satisfied, the system will continue monitoring available sensor data.

If the IF conditions are met, the system may optionally prompt a user for confirmation if the action may be costly or otherwise undesirable (Step 302). For example, if acting on one or more rules would cause the system to both activate the air conditioning and open a window on a hot summer day, the system may require that the user respond to an electronic message or audio prompt before the window is opened or the air conditioning is activated, in order to avoid increasing the user's energy bill considerably. Similarly, if acting on a rule would cause all lights to be turned off, at night, in a non-bedroom where a human user is sitting, the system may require confirmation before leaving the user in the dark and unable to navigate out of the room.

Whether automatically (after Step 301) or in response to a human confirmation (after Step 302), the system may implement the anticipated human action (Step 303). Implementation may take the form of wirelessly sending a command to an API of a smart appliance 101, or otherwise directly or indirectly controlling a device to which the central computing device 103 is coupled by a wired or wireless connection. Implementation of the anticipated human action may include, as in above examples, automatically changing the heat, cooling, light, or other aspects of an environment; automatically turning on or off or changing a setting or mode of a device; or sending a message through a communications medium (such as sending a text or email, or automatically ordering a pizza or other item).

After acting, the system may optionally transmit a confirmation or otherwise notify the user that action has been taken (Step 304). For example, if the user is getting ready for work and the system has turned on the user's car, the user may receive a text saying that "Your car's engine is now warming up!" If a pizza is automatically ordered as in the above example, a speaker may be used to audibly tell the user that a pizza is on the way. Based on the actual action taken, it may be undesirable or redundant to inform the user that action has been taken, for example if the action is turning off the lights at night or turning on a fan when the temperature is hot.

FIG. 4 depicts, in simplified form, a flowchart of a method for refining existing IFTTT rules, either through additional machine-gathered data or through human guidance.

The system may provide a means (such as a graphical user interface on a screen of central computing device 103, or a webpage or other interface which acts as an interface on a computer or mobile device that connects wirelessly to central computing device 103) for a human user to modify the rules generated by or enforced by central computing device 103. The system can, as part of the operation of its software, always be checking whether a user is attempting to access the interface for rules modification (Step 400).

Upon determining that the human user has requested the interface, the system can show one or more of the generated rules to the human user (Step 401). In some embodiments, the interface may simply list every rule generated by the system thus far, while in other embodiments, the system may allow the user to search for a rule or filter out rules from a list using one or more criteria, such as all rules that have a condition based on input from a certain sensor (e.g., all rules that trigger based on a temperature, or time, or light level, etc.), all rules that affect a certain appliance/actuator (e.g., all rules that result in a change in the HVAC system, all rules that result in a change to the lighting system, all rules that can cause a text message to be sent, etc.), all rules that were last triggered during a certain time range (e.g., all rules whose THEN consequence were triggered in the last five minutes), all rules that were generated during a certain time range (e.g., any rules that were created on a recent holiday, and thus might not represent human actions that would have been taken if that were an ordinary day of the week), or some other criteria.

After displaying one or more rules to the human user, the system may receive human user input, including commands to select, modify, and/or delete a rule (Step 402). Modification may comprise adding an additional IF condition, removing an IF condition, adding a THEN consequence, removing a THEN consequence, or changing the sensitivity of the rule to being triggered (i.e., broadening or narrowing a range of temperatures/humidities/light levels/times needed to trigger an IF condition, changing a number of IF condition that must register as true for the THEN consequence to trigger in a fuzzier IFTTT rule, etc.).

Upon receiving the user input showing an intended modification, the stored rules may be updated (Step 403), and the system can determine whether any further changes are desired by the user (Step 401).

If the user is not attempting to actively review or refine any rules of the system, the system monitors the sensor data available to it and determines whether the IF conditions for any given rule have been met (Step 404, equivalent to Step 301, above).

If the system has begun implementing the THEN consequence of an identified IFTTT rule, the system may also monitor any human user present to determine whether the human user is acting to countermand the THEN consequence (Step 405). For example, the system may begin to increase a level of air conditioning and the user may immediately turn it back down, or the system may turn on lights or increase the light level of a light with a dimmer switch and the user may respond by turning off or dimming the light, or the system may turn on an electronic appliance and the user may respond by turning it back off. Countermanding may also be indicated in other ways, such as a user verbalizing or making non-verbal sounds interpreted to be an expression of frustration or confusion, a user ceasing a previous activity and walking over to the central computing device 103, a user verbalizing a command contrary to the THEN consequence (e.g., "Alexa, turn out those lights."), or the user remaining inactive even after the THEN consequence fails to be implemented because of a network error or error at the actuator (e.g., the user not getting up to adjust the heat even after the system has failed to increase the heat and the room temperature has dropped below the range indicated in an IFTTT rule for maintaining a pleasant room temperature).

If the user appears to be countermanding any executed THEN consequence, the system may refine any rules that seem partially countermanded by a user (Step 406). For example, if an IFTTT rule was set to trigger at a temperature of 75 degrees or greater, but upon the temperature reaching 75 degrees, the user turns off the air conditioning that was automatically activated, the rule may have its IF condition revised to increase the triggering temperature from 75 to 77 degrees. In some embodiments, additional IF conditions may be added to a countermanded rule until the user no longer attempts to countermand it, instead of or in addition to changing the values associated with existing IF conditions.

In some embodiments, the system may alert the user that the system has refined or changed rules based on the user's actions (Step 407). This may take the form of a push message to a computing device used by the user, a notification on a screen of central computing device 103 itself, an audio prompt generated by central computing device 103, or any other method of notifying the user of the change. The notification may be coupled with a prompt for the user to indicate whether the change in rule was desired, and if so, re-entry into the interface for allowing user modification of rules (Steps 401-403). Otherwise, the base loop (Steps 401 and 404) continues until the user actively or passively indicates that the rules do not accurate automate behavior hoped for by the user.

The embodiments presently described may be a system, a method, and/or a computer program product at any possible technical detail level of integration. The computer program product may include a computer readable storage medium (or media) having computer readable program instructions thereon for causing a processor to carry out aspects of the present invention.

Figure 5:
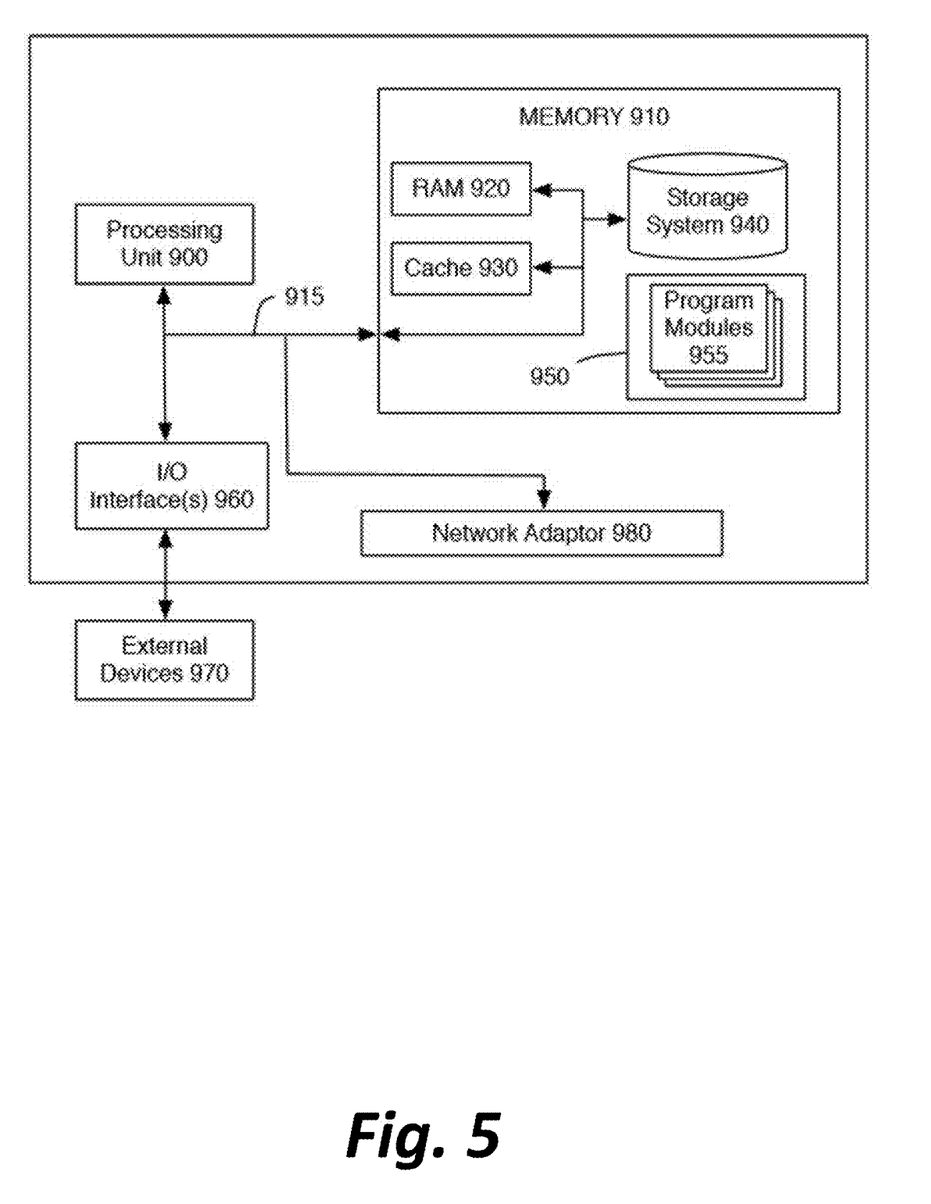
FIG. 5 is a high-level block diagram of a representative computing device that may be utilized to implement various features and processes described herein

FIG. 5 is a high-level block diagram of a representative computing device that may be utilized to implement various features and processes described herein, including, for example, the functionality of central computing device 103, any devices incorporating sensors 102, or any of smart appliances 101. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for anticipating and rendering unnecessary human action, comprising:
    a plurality of smart appliances;
    a central computing device comprising one or more processors and non-transitory memory storing instructions; and
    a plurality of electronic sensors comprising every electronic sensor that is both in an environment comprising the plurality of smart appliances and is communicatively coupled to the central computing device and configured to transmit sensor readings to the central computing device;
    wherein the instructions stored in the non-transitory memory, when executed by the one or more processors, cause the central computing device to:
       receive one or more sensor readings from each electronic sensor of the plurality of electronic sensors during a first time period;
       receive one or more status readings from each smart appliance of the plurality of smart appliances during the first time period wherein at least one particular status reading of the one or more status readings indicates a change in status of a particular smart appliance of the plurality of smart appliances, the change in status having been manually caused by a human user;
       create an "if this then that" (IFTTT) rule based on a determined relationship between the one or more sensor readings and the at least one particular status reading, wherein "then that" consequences of the IFTTT rule comprise the change in status of the particular smart appliance, and wherein "if this" conditions of the IFTTT rule comprise conditions based on each electronic sensor of the plurality of electronic sensors and based on a status reading of each smart appliance of the plurality of smart appliances that did not experience a change in status during the first time period; and
       in response to determining, that sensor readings or status readings received during a second time period after the first time period match all "if this" conditions of the IFTTT rule, implement the "then that" consequences of the IFTTT rule without requiring the human user to manually implement the "then that" consequence of the IFTTT rule.

2. The system of claim 1, wherein the plurality of electronic sensors comprise two or more of a sensor of temperature, light, or humidity, and wherein the "if this" conditions comprise at least two of a certain temperature being sensed by the plurality of electronic sensors, a certain light level being sensed by the plurality of electronic sensors, or a certain humidity level being sensed by the plurality of electronic sensors.

3. The system of claim 1, wherein the "if this" conditions of the IFTTT rule also comprise a condition based on sensor readings received at a weather station and forwarded through a weather service.

4. The system of claim 1, wherein the relationship is determined based in part on a time frequency analysis of the one or more sensor readings and the one or more status readings.

5. The system of claim 1, wherein the IFTTT rule is created based at least in part on automatically modifying an existing IFTTT rule to remove an "if this" condition of the existing IFTTT rule or to narrow a range of an "if this" condition of the existing IFTTT rule.

6. The system of claim 5, wherein the non-transitory memory stores instructions that, when executed by the one or more processors, further cause the central computing device to:

modify the existing IFTTT rule based on a human user's action that contradicts a "then that" consequence of the existing IFTTT rule, wherein the human user's action contradicts via changing the state of a smart appliance to a state other than a state indicated by the "then that" consequence.

7. The system of claim 1, wherein the "then that" consequence is additionally implemented in response to satisfaction of a number of the "if this" conditions greater than one but less than a total number of "if this" conditions.

8. The system of claim 1, wherein the IFTTT rule comprises a plurality of "if this" conditions, each assigned a weighting, and wherein the "then that" consequence is implemented in response to a total weighted score of satisfied "if this" conditions greater than a predetermined amount.

9. A computer-implemented method for actuating a smart appliance from a plurality of smart appliances in response to sensor input, comprising:

receiving, at a central computing device, one or more sensor readings from each electronic sensor of a plurality of electronic sensors during a first time period, wherein the plurality of electronic sensors comprise every electronic sensor that is both in an environment comprising the plurality of smart appliances and is communicatively coupled to the central computing device and configured to transmit sensor readings to the central computing device;

receiving, at the central computing device, one or more status readings from a plurality of smart appliances during the first time period, wherein at least one particular status reading of the one or more status readings indicates a change in status of particular smart appliance from the plurality of smart appliances, the change in status having been manually caused by a human user;

creating, by the central computing device, an IFTTT rule based on a determined relationship between the one or more sensor readings and the at least one particular status reading, wherein "then that" consequences of the IFTTT rule comprise the change in status of the particular smart appliance, and wherein the IFTTT rule comprises a plurality of "if this" conditions based on each electronic sensor of the plurality of electronic sensors and based on a status reading of each smart appliance of the plurality of smart appliances that did not experience a change in status during the first time period; and in response to determining that sensor readings received during a second time period after the first time period match all "if this" conditions of the IFTTT rule, implementing, via the central computing device, the "then that" consequences of the IFTTT rule without requiring the human user to manually cause the change in status of the smart appliance.

10. The method of claim 9, wherein at least one "if this" condition comprises a sensor reporting a certain temperature, a certain light level, or a certain humidity level.

11. The method of claim 9, wherein additional sensor readings are received from a remote external service.

12. The method of claim 9, wherein the relationship is determined based in part on a time frequency analysis of the one or more sensor readings and the one or more status readings.

13. The method of claim 9, further comprising:

automatically modifying an existing IFTTT rule to remove an "if this" condition of the existing IFTTT rule or to narrow a range of an "if this" condition of the existing IFTTT rule.

14. The method of claim 13, further comprising:

modifying the existing IFTTT rule based on a human user's action that contradicts a "then that" consequence of the IFTTT rule, wherein the human user's action contradicts via changing the state of a smart appliance to a state other than a state indicated by the "then that" consequence.

15. The method of claim 9, wherein the "then that" consequence is implemented in response to satisfaction of a number of the "if this" conditions greater than one but less than a total number of the "if this" conditions.

16. The method of claim 9, wherein each "if this" condition of the IFTTT rule is assigned a weighting, and wherein the "then that" consequence is implemented in response to a total weighted score of satisfied "if this" conditions greater than a predetermined amount.

* * * * *